US010253994B2

(12) United States Patent
Tucker et al.

(10) Patent No.: US 10,253,994 B2
(45) Date of Patent: Apr. 9, 2019

(54) HVAC CONTROLLER WITH VENTILATION REVIEW MODE

(71) Applicant: Ademco Inc., Golden Valley, MN (US)

(72) Inventors: Jaymeson Tucker, Minneapolis, MN (US); John B. Amundson, Minneapolis, MN (US); Preston Gilmer, Delano, MN (US); Sriharsha Putrevu, Maple Grove, MN (US)

(73) Assignee: Ademco Inc., Golden Valley, MN (US)

( * ) Notice: Subject to any disclaimer, the term of this patent is extended or adjusted under 35 U.S.C. 154(b) by 17 days.

(21) Appl. No.: 15/217,766

(22) Filed: Jul. 22, 2016

(65) Prior Publication Data

US 2018/0023826 A1 Jan. 25, 2018

(51) Int. Cl.
| | |
|---|---|
| *F24F 11/00* | (2018.01) |
| *G05B 19/409* | (2006.01) |
| *F24F 11/89* | (2018.01) |
| *F24F 11/30* | (2018.01) |
| *F24F 11/62* | (2018.01) |

(Continued)

(52) U.S. Cl.
CPC .......... *F24F 11/0001* (2013.01); *F24F 11/30* (2018.01); *F24F 11/62* (2018.01); *F24F 11/89* (2018.01); *G05B 15/02* (2013.01); *G05B 19/409* (2013.01); *F24F 11/58* (2018.01); *F24F 11/59* (2018.01); *F24F 11/64* (2018.01); *F24F 2110/00* (2018.01); *F24F 2120/20* (2018.01); *G05B 2219/25067* (2013.01);
(Continued)

(58) Field of Classification Search
CPC .... F24F 11/0001; F24F 11/001; F24F 11/006; F24F 11/02; F24F 2011/0057; F24F 2011/0063; F24F 2011/0071; F24F 2011/0072; G05B 19/409; G05B 2219/2614
USPC ....................................................... 700/276
See application file for complete search history.

(56) References Cited

U.S. PATENT DOCUMENTS

| | | | |
|---|---|---|---|
| 2,495,861 | A | 1/1950 | Newton |
| 2,882,383 | A | 4/1959 | Boyd, Jr. et al. |

(Continued)

FOREIGN PATENT DOCUMENTS

| | | |
|---|---|---|
| DE | 3334117 | 4/1985 |
| EP | 0434926 | 8/1995 |

(Continued)

OTHER PUBLICATIONS

U.S. Appl. No. 62/320,947, filed Apr. 2016, Conley; Justin Dean.*
(Continued)

*Primary Examiner* — Christopher E. Everett
*Assistant Examiner* — Michael J Huntley
(74) *Attorney, Agent, or Firm* — Shumaker & Sieffert, P.A.

(57) ABSTRACT

Methods and systems for setting up HVAC controllers for a particular installation site are disclosed. In an example, an HVAC controller may be configured to control at least part of an HVAC system in accordance with an algorithm that includes equipment information pertaining to operation of the specific HVAC equipment forming the HVAC system as well as comfort information such as desired temperatures. In some cases, the HVAC controller may be configured to enable display of certain of the equipment information in a read-only fashion, and in some cases, certain of the equipment information that would be of interest to an building inspector.

18 Claims, 12 Drawing Sheets

(51) Int. Cl.
*G05B 15/02* (2006.01)
*F24F 11/59* (2018.01)
*F24F 11/64* (2018.01)
*F24F 11/58* (2018.01)
*F24F 120/20* (2018.01)
*F24F 110/00* (2018.01)

(52) U.S. Cl.
CPC ............. *G05B 2219/25083* (2013.01); *G05B 2219/2614* (2013.01); *G05B 2219/2642* (2013.01)

(56) References Cited

U.S. PATENT DOCUMENTS

| | | |
|---|---|---|
| 3,454,078 A | 7/1969 | Elwart |
| 3,635,044 A | 1/1972 | Heth |
| 3,948,438 A | 4/1976 | Vlasak |
| 4,011,735 A | 3/1977 | Martz et al. |
| 4,075,864 A | 2/1978 | Schrader |
| 4,079,366 A | 3/1978 | Wong |
| 4,136,822 A | 1/1979 | Felter |
| 4,174,807 A | 11/1979 | Smith et al. |
| 4,206,872 A | 6/1980 | Levine |
| 4,224,615 A | 9/1980 | Penz |
| 4,264,034 A | 4/1981 | Hyltin et al. |
| 4,267,967 A | 5/1981 | Beck et al. |
| 4,298,946 A | 11/1981 | Hartsell et al. |
| 4,308,991 A | 1/1982 | Peinetti et al. |
| 4,337,822 A | 7/1982 | Hyltin et al. |
| 4,356,962 A | 11/1982 | Levine |
| 4,369,916 A | 1/1983 | Abbey |
| 4,382,544 A | 5/1983 | Stewart |
| 4,386,649 A | 6/1983 | Hines et al. |
| 4,388,692 A | 6/1983 | Jones et al. |
| 4,408,711 A | 10/1983 | Levine |
| 4,431,134 A | 2/1984 | Hendricks et al. |
| 4,442,972 A | 4/1984 | Sahay et al. |
| 4,446,913 A | 5/1984 | Krocker |
| 4,452,391 A | 6/1984 | Chow |
| 4,467,617 A | 8/1984 | Morgan, Jr. et al. |
| 4,479,604 A | 10/1984 | Didner |
| 4,502,625 A | 3/1985 | Mueller |
| 4,506,827 A | 3/1985 | Jamieson et al. |
| 4,571,950 A | 2/1986 | Nariai et al. |
| 4,595,139 A | 6/1986 | Levine |
| 4,606,401 A | 8/1986 | Levine et al. |
| 4,621,336 A | 11/1986 | Brown |
| 4,622,544 A | 11/1986 | Bially et al. |
| 4,684,060 A | 8/1987 | Adams et al. |
| 4,717,333 A | 1/1988 | Carignan |
| 4,718,021 A | 1/1988 | Timblin |
| 4,725,001 A | 2/1988 | Carney et al. |
| 4,742,475 A | 5/1988 | Kaiser et al. |
| 4,773,587 A | 9/1988 | Lipman |
| 4,776,385 A | 10/1988 | Dean |
| 4,819,714 A | 4/1989 | Otsuka et al. |
| 4,837,731 A | 6/1989 | Levine et al. |
| 4,838,482 A | 6/1989 | Vogelzang |
| 4,881,686 A | 11/1989 | Mehta |
| 4,918,439 A | 4/1990 | Wozniak et al. |
| 4,930,460 A | 6/1990 | Aihara et al. |
| 4,941,325 A | 7/1990 | Nuding |
| 4,948,040 A | 8/1990 | Kobayashi et al. |
| 4,951,473 A | 8/1990 | Levine et al. |
| 4,992,779 A | 2/1991 | Sugino et al. |
| 4,997,029 A | 3/1991 | Otsuka et al. |
| 5,012,973 A | 5/1991 | Dick et al. |
| 5,020,332 A | 6/1991 | Nakatsuno et al. |
| 5,038,851 A | 8/1991 | Mehta |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,131,236 A | 7/1992 | Wruck et al. |
| 5,140,310 A | 8/1992 | DeLuca et al. |
| 5,142,880 A | 9/1992 | Bellis |
| 5,161,606 A | 11/1992 | Berkeley et al. |
| 5,170,935 A | 12/1992 | Federspiel et al. |
| 5,179,524 A | 1/1993 | Parker et al. |
| 5,181,653 A | 1/1993 | Foster et al. |
| 5,230,482 A | 7/1993 | Ratz et al. |
| 5,238,184 A | 8/1993 | Adams |
| 5,239,854 A | 8/1993 | Hinson |
| 5,241,253 A | 8/1993 | Schlangen |
| 5,251,813 A | 10/1993 | Kniepkamp |
| 5,259,445 A | 11/1993 | Pratt et al. |
| 5,282,770 A | 2/1994 | Shibata |
| 5,325,286 A | 6/1994 | Weng et al. |
| 5,329,991 A | 7/1994 | Mehta et al. |
| 5,348,078 A | 9/1994 | Dushane et al. |
| 5,386,577 A | 1/1995 | Zenda |
| 5,415,617 A | 5/1995 | Kraus |
| 5,433,377 A | 7/1995 | Sodo et al. |
| 5,482,209 A | 1/1996 | Cochran et al. |
| 5,492,273 A | 2/1996 | Shah |
| 5,526,422 A | 6/1996 | Keen |
| 5,537,106 A | 7/1996 | Mitsuhashi |
| 5,547,017 A | 8/1996 | Rudd |
| 5,566,879 A | 10/1996 | Longtin |
| 5,570,837 A | 11/1996 | Brown et al. |
| 5,579,993 A | 12/1996 | Ahmed et al. |
| 5,673,850 A | 10/1997 | Uptegraph |
| 5,707,005 A | 1/1998 | Kettler et al. |
| 5,727,887 A | 3/1998 | Webster et al. |
| 5,742,516 A | 4/1998 | Olcerst |
| 5,782,296 A | 7/1998 | Mehta |
| 5,791,408 A | 8/1998 | Seem |
| 5,803,804 A | 9/1998 | Meier et al. |
| 5,818,428 A | 10/1998 | Eigenbrandt et al. |
| 5,862,982 A | 1/1999 | Federspiel |
| 5,873,519 A | 2/1999 | Beilfuss |
| 5,881,806 A | 3/1999 | Rudd |
| 5,884,806 A | 3/1999 | Boyer et al. |
| 5,886,697 A | 3/1999 | Naughton et al. |
| 5,901,183 A | 5/1999 | Garin et al. |
| 5,902,183 A | 5/1999 | D'Souza |
| 5,937,942 A | 8/1999 | Bias et al. |
| 5,947,372 A | 9/1999 | Tiernan |
| 5,971,846 A | 10/1999 | Cho et al. |
| 6,020,881 A | 2/2000 | Naughton et al. |
| 6,032,867 A | 3/2000 | Dushane et al. |
| 6,059,195 A | 5/2000 | Adams et al. |
| 6,079,627 A | 6/2000 | Kettler |
| 6,081,197 A | 6/2000 | Garrick et al. |
| 6,121,875 A | 9/2000 | Hamm et al. |
| 6,140,987 A | 10/2000 | Stein et al. |
| 6,161,764 A | 12/2000 | Jatnieks |
| 6,170,271 B1 | 1/2001 | Sullivan |
| 6,179,627 B1 | 1/2001 | Daly et al. |
| 6,192,282 B1 | 2/2001 | Smith et al. |
| 6,196,467 B1 | 3/2001 | Dushane et al. |
| 6,208,331 B1 | 3/2001 | Singh et al. |
| 6,236,326 B1 | 5/2001 | Murphy |
| 6,241,156 B1 | 6/2001 | Kline et al. |
| 6,259,074 B1 | 7/2001 | Brunner et al. |
| 6,285,912 B1 | 9/2001 | Ellison et al. |
| 6,290,140 B1 | 9/2001 | Pesko et al. |
| 6,315,211 B1 | 11/2001 | Sartain et al. |
| 6,318,639 B1 | 11/2001 | Toth |
| 6,330,806 B1 | 12/2001 | Beaverspn et al. |
| 6,344,861 B1 | 2/2002 | Naughton et al. |
| 6,351,693 B1 | 2/2002 | Monie et al. |
| 6,398,118 B1 | 6/2002 | Rosen et al. |
| 6,415,617 B1 | 7/2002 | Seem |
| 6,431,268 B1 | 8/2002 | Rudd |
| 6,467,695 B1 | 10/2002 | Riley et al. |
| 6,478,233 B1 | 11/2002 | Shah |
| 6,502,758 B2 | 1/2003 | Cottrell |
| 6,514,138 B2 | 2/2003 | Estepp |
| 6,518,957 B1 | 2/2003 | Lehtinen et al. |
| 6,578,770 B1 | 6/2003 | Rosen |
| 6,580,950 B1 | 6/2003 | Johnson et al. |
| 6,581,846 B1 | 6/2003 | Rosen |
| 6,595,430 B1 | 7/2003 | Shah |

(56) References Cited

U.S. PATENT DOCUMENTS

| | | | |
|---|---|---|---|
| 6,609,967 | B2 | 8/2003 | Sharp et al. |
| 6,619,555 | B2 | 9/2003 | Rosen |
| 6,621,507 | B1 | 9/2003 | Shah |
| 6,644,557 | B1 | 11/2003 | Jacobs |
| 6,698,219 | B2 | 3/2004 | Sekhar et al. |
| 6,779,735 | B1 | 8/2004 | Onstott |
| 6,783,079 | B2 | 8/2004 | Carey et al. |
| 6,786,421 | B2 | 9/2004 | Rosen |
| 6,789,739 | B2 | 9/2004 | Rosen |
| 6,824,069 | B2 | 11/2004 | Rosen |
| 6,833,990 | B2 | 12/2004 | LaCroix et al. |
| 6,886,754 | B2 | 5/2005 | Smith et al. |
| 6,967,565 | B2 | 11/2005 | Lingemann |
| 6,983,889 | B2 | 1/2006 | Alles |
| 6,988,671 | B2 | 1/2006 | DeLuca |
| 7,001,495 | B2 | 2/2006 | Esalik et al. |
| 7,016,744 | B2 | 3/2006 | Howard et al. |
| 7,044,397 | B2 | 5/2006 | Bartlett et al. |
| 7,050,026 | B1 | 5/2006 | Rosen |
| 7,114,554 | B2 | 10/2006 | Bergman et al. |
| 7,130,719 | B2 | 10/2006 | Ehlers et al. |
| 7,152,806 | B1 | 12/2006 | Rosen |
| 7,156,318 | B1 | 1/2007 | Rosen |
| 7,302,642 | B2 | 11/2007 | Smith et al. |
| 7,320,110 | B2 | 1/2008 | Shah |
| 7,360,717 | B2 | 4/2008 | Shah |
| 7,373,303 | B2 | 5/2008 | Moore et al. |
| 7,475,828 | B2 | 1/2009 | Bartlett et al. |
| 7,661,603 | B2 | 2/2010 | Yoon et al. |
| 7,706,923 | B2 | 4/2010 | Amundson et al. |
| 7,979,163 | B2 | 7/2011 | Terlson et al. |
| 8,239,067 | B2 | 8/2012 | Amundson et al. |
| 8,543,244 | B2 | 9/2013 | Keeling et al. |
| 9,261,290 | B2 | 2/2016 | Storm |
| 9,584,583 | B2 * | 2/2017 | Schwartz ............... H04L 67/025 |
| 9,625,893 | B2 * | 4/2017 | Cho ......................... G05B 19/02 |
| 9,841,827 | B2 * | 12/2017 | Gomez ................... G06F 3/033 |
| 2001/0029585 | A1 | 10/2001 | Simon et al. |
| 2001/0048030 | A1 | 12/2001 | Sharood et al. |
| 2001/0052459 | A1 | 12/2001 | Essalik et al. |
| 2002/0016639 | A1 | 2/2002 | Smith et al. |
| 2002/0092779 | A1 | 7/2002 | Essalik et al. |
| 2003/0034897 | A1 | 2/2003 | Shamoon et al. |
| 2003/0034898 | A1 | 2/2003 | Shamoon et al. |
| 2004/0262410 | A1 | 12/2004 | Hull |
| 2005/0040248 | A1 * | 2/2005 | Wacker ................ F24F 11/0086 |
| | | | 236/51 |
| 2005/0234596 | A1 | 10/2005 | Rietschel |
| 2010/0162111 | A1 | 6/2010 | Amundson et al. |
| 2011/0223850 | A1 | 9/2011 | Narayanamurthy et al. |
| 2012/0022701 | A1 | 1/2012 | Amundson et al. |
| 2013/0204497 | A1 | 8/2013 | DePetro |
| 2013/0321340 | A1 * | 12/2013 | Seo ......................... G06F 1/1641 |
| | | | 345/174 |
| 2015/0253025 | A1 | 9/2015 | Helt et al. |
| 2017/0292725 | A1 * | 10/2017 | Conley .................. F24F 11/001 |

FOREIGN PATENT DOCUMENTS

| | | |
|---|---|---|
| EP | 0678204 | 3/2000 |
| EP | 0985994 | 3/2000 |
| EP | 1074009 | 3/2002 |
| WO | WO 97/11448 | 3/1997 |
| WO | WO 97/39392 | 10/1997 |
| WO | WO 00/43870 | 7/2000 |
| WO | WO 01/52515 | 7/2001 |
| WO | WO 01/79952 | 10/2001 |
| WO | WO 01/93779 | 12/2001 |
| WO | WO 02/061344 | 8/2002 |

OTHER PUBLICATIONS

Singh, Demand of pharmaceutical facility functionality: Validation and qualification of HVAC system, MIPS:India, Apr. 2014, pp. 125-129 (accessed from <<https://www.asiapharrnaceutics.info/index.php/ajp/article/view/349/333>> on Jun. 26, 2018). (Year: 2014).*

"CorAccess Systems/In Home," http://web.archive.org/web20011212084427/www.coraccess.com/home.html, 1 page, copyright 2001, printed Aug. 19, 2004.

"HAI Company Background," http://www.homeauto.com/AboutHAI/abouthai_main.htm, 2 pages, printed Aug. 19, 2004.

"High-tech options take hold in new homes—Aug. 28, 200—Dallas Business Journal," http://bizjournals.com/dallas/stories/2000/08/28/focus4, 3 pages, dated Aug. 28, 2000, printed Aug. 19, 2004.

"Home Toys Review—TouchLinc," http://www.hometoys.com/htinews/aug99/reviews/touchlinc/touchlinc.htm, 3 pages, dated Aug. 1999, printed Aug. 20, 2004.

"HTI News Release," http://www.hometoys.com/htinews/apr99/releases/ha101.htm, 3 pages, Apr. 1999.

"Mark of Excellence Award Finalist Announced," http://64.233.167.104/search?Q=cache:ciOA2YtYaBIJ:www.hometoys.com/releases/mar. . . , 6 pages, Leopard Touchscreen on p. 2, dated prior to Mar. 4, 2000, printed Aug. 20, 2004.

"Product Review—Philips Pronto Remote Control," http://hometheaterhifi.com/vol_6_2/philipsprontoremotecontrol.html, 5 pages, dated May. 1999, printed Aug. 20, 2004.

"RC X10 Automation Forum: Control your Heating and Cooling System with Pronto(1/1)," http://wwww.remotecentral.com/cgi-bin/mboard/rc-x10/thread.cgi?12, 2 pages, dated Apr. 23, 1999, printed Aug. 20, 2004.

"Spotlight on integrated systems," Custom Builder, V8, N2, p. 66(6), Mar.-Apr. 1993.

"Vantage Expands Controls for Audio/Video, HVAC and Security," http://www.hometoys.com/htinews/aug99/releases/vantage03.htm, 2 pages, dated Aug. 3, 1999, printed Aug. 20, 2004.

"Vitodens, Vitoplus—mit Regulung fur witterungsgefuhrten Betrieb und menugefuhrter Bedienungseinheit Comfortrol, Bedienungsanleitung fur den Anlagenbetreiber" Mar. 2003, Viessmann, Allendorf, XP002320590Retrieved from the Internet: URL: http://www.viessmann.de/web/germany/tdis_endv.nsf/a8363d62fec7daa4c1256ddb002770.

Adi, "Leopard User Manual," 93 pages, 2001.

Adicon 2500, "The Automator," 4 pages, Oct.-Dec. 2000.

ADT Security Services, "iCenter Advanced User Interface 8142ADT," Installation and Setup Guide, 4 pages, May 2001; First Sale Feb. 2001.

Aprilaire Electronic Thermostats Models 8344, 8346, 8348, 8363, 8365, 8366 Operating Instructions, 8 pages, 2003.

Aprilaire, "Advantage," vol. 1, Issue 6, 4 pages, Jun. 2003.

Aprilaire, "Fresh Air Intake Installation Instructions," 1 page, 2002.

Aprilaire, "Ventilation Control System Model 8126," 1 page, Jun. 2003.

Aprillaire, "Dehumidifier, Safety and Installation Instructions, Model 1700," 15 pages, 2004.

Ashrae Standard, "Ventilation and Acceptable Indoor Air Quality in Low-Rise Residential Buildings," BSR/ASRAE Standard 62.2P, Fourth Public Review, Nov. 2002.

Aube Technologies, Electronic Thermostat for Heating System Model TH135-01, 5 pages, Aug. 14, 2001.

Aube Technologies, TH140-28 Electronic Programmable Thermostat, Installation Instructions and User Guide, pp. 1-4, Jan. 22, 2004.

AutomatedBuildings.com Article—"Thin Client" Solutions, "Pressure, Air Flow, Temperature, Humidity & Valves," Dwyer Instruments, Inc., 5 pages, printed Sep. 20, 2004.

Blake et al., "Seng 310 Final Project Demo Program" Illustration, 3 pages, Apr. 6, 2001.

Blake et al., "Seng 310 Final Project" Report, dated Apr. 6, 2001.

Blister Pack Insert from a Ritetemp 8082 Touch Screen Thermostat Product, 2 pages, 2002.

Braeburn Model 3000 Owner's Manual, pp. 1-13, 2001.

Braeburn Model 5000 Owner's Manual, pp. 1-17, 2001.

BRK Electronics Maximum Protection Plus Ultimate Convenience Smoke Alarm, 24 pages, Sep. 2000.

BRK First Alert, User's Manual, Smoke and Fire Alarms, pp. 1-7, Nov. 2002.

(56) References Cited

OTHER PUBLICATIONS

Business Wire, "MicroTouch Specialty Products Group to Capitalize on Growing Market for Low-Cost Digital Matrix Touchscreens," p. 1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews.Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Apr. 21, 2005.
Carrier, "Programmable Dual Fuel Thermostats," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control, Installation, Start-Up, and Operating Instructions," pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16, 2002.
Domotique Secant Home Automation—Web Page, available at http://www.secant.ca/En/Company/Default.asp, 1 page, printed Sep. 28, 2004.
Firex Smoke Alarm, Ionization Models AD, ADC Photoelectric Model Pad, 4 pages, prior to Apr. 21, 2005.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° C. Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell Inc., "Field Demonstration of a Residential Ventilation Controller," EPRI Research Project 3512-04, Final Report, Mar. 1995.
Honeywell Inc., "Perfect Climate Comfort Center," Owners Guide, 44 pages, 1998.
Honeywell Inc., "Residential Ventilation control," EPRI Research Project 2034-44, May 1993.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 2.0," Operator Manual, 70 pages, Apr. 1995.
Honeywell, "Perfect Climate Comfort Center," Quick Guide, 6 pages, 1996.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://content.honeywell.com/yourhome/ptc-thermostats/PC8900faq.htm, Honeywell, Your Home Expert—Programmable Thermostats: FAQ, 10 pages, printed Feb. 4, 2004.
http://www.aircycler.com/frv.html, "AirCycler—The Indoor Air Quality Solution," 2 pages, printed Feb. 4, 2004.
http://www.aircycler.com/instfrv.htm, "AirCycler FR-V Installation," 2 pages, printed Feb. 4, 2004.
http://www.aircycler.com/instfrv.htm, "FR—Installation," 3 pages, printed Feb. 4, 2004.
http://www.cc.gatech.edu/computing/classes/cs6751_94_fall/groupc/climate-2/node1.html, "Contents," 53 pages, printed Sep. 20, 2004.
http://www.ritetemp.info/rtMenu_13.html, Rite Temp 8082, 6 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Auto Saver 550", Owner's Manual Model 44550, 44 pages, prior to Jul. 7, 2004.
Install Guide for Ritetemp Thermostat 8082, 6 pages, 2002.
Invensys™, "9700i 9701i 9715i 9720i Deluxe Programmable Thermostats," User's Manual, pp. 1-28, prior to Jul. 7, 2004.
Lennox, "Network Control Panel (NCP)," User's Manual, 18 pages, Nov. 1999.
Lifebreath, "Current Events Fall Edition," 4 pages, Sep. 1999.
Lipidex Corporation, "AirCycler, Improving Indoor Air Quality," 23 pages, printed Sep. 8, 2003.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.

(56) References Cited

OTHER PUBLICATIONS

Metasys, "HVAC PRO for Windows User's Manual," 308 pages, 1998.
Metasys, "Metasys Unitary Controller (UNT), Metasys Network Sales Resource Manual 635," 96 pages, Feb. 1995.
Metasys, "Unitary Controller (UNT), Technical Bulletin," Application Specfic Controllers Technical Manual 636.3, 96 pages, Mar. 1998.
Mounting Template for Ritetemp Thermostat 8082, 1 page, 2002.
Nutech Energy Systems Inc., "Lifebreath Clean Air Furnace "Electric" Clean Air Furnace Manual Model 60ELE" pp. 1-18, downloaded Feb. 5, 2004.
Nutech Energy Systems Inc., "Operating Your Ventilation Dehumidistat," Operating the 99-250 Ventilation Dehumidistat, 2 pages, downloaded Feb. 4, 2004.
Nutech Energy Systems Inc., "Programmable Ventilation Controller 99-105," Operation and Installation Manual, 4 pages, downloaded Feb. 4, 2004.
Operation Manual for Ritetemp Touch Screen Thermostat 8082, 8 pages, 2002.
Proliphix, "Web Enabled IP Thermostats, Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Sealed Unit Parts Co., Inc., Supco & CTC Thermostats . . . loaded with features, designed for value!, 6 pages, prior to Apr. 21, 2005.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 For All Programmable Digital Thermostat," Owner's Manual P/N P374-1100, 24 pages, Apr. 2001.
Totaline, "1 For All Programmable Digital Thermostat," Owner's Manual P/N P474-1050, 21 pages, Nov. 1998.
Totaline, "1 For All Programmable Digital Thermostat," Owner's Manual P/N P374-1100FM, 23 pages, Nov. 1998.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.

Trane, "System Programming, Tracer Summit Version 14, BMTW-SVP01D-EN," 623 pages, 2002.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.

\* cited by examiner

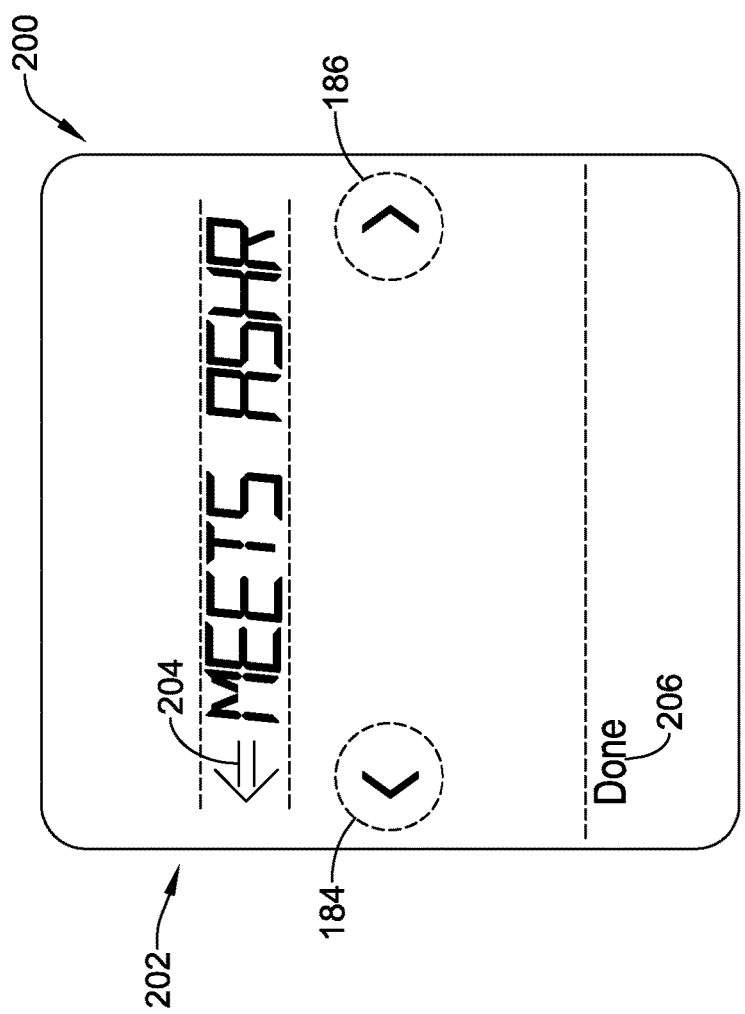

HVAC CONTROLLER WITH VENTILATION REVIEW MODE

TECHNICAL FIELD

The present disclosure relates to Heating, Ventilation, and/or Air Conditioning (HVAC) systems, and more particularly to methods and systems for setting up such HVAC systems for a particular installation site.

BACKGROUND

Heating, Ventilation, and/or Air Conditioning (HVAC) systems are often used to control the comfort level within a building or other structure. Such HVAC systems typically include an HVAC controller that controls various HVAC components of the HVAC system in order to affect and/or control one or more environmental conditions within the building. In many cases, the HVAC controller is mounted to an internal wall of the building and provides control signals to various HVAC components of the HVAC system. Typically, during installation, the HVAC controller must be setup by an installer to properly control the particular HVAC components installed at the site. To support this, many HVAC controllers provide a series of installer setup screens that are accessible by the installer to facilitate entry of appropriate setup parameters. There can be a significant number of parameters that must be setup.

In some cases, particular installation settings must be reviewed by an inspector to meet certain building requirements. In many cases, the inspector must go through the same installer setup screens to access the settings values of interest. Sometimes, the inspector may inadvertently change one of the settings during the inspection process, which can cause the HVAC system to operate in a sub-optimal way if not caught later by the installer.

SUMMARY

The disclosure is directed to methods and systems for setting up HVAC controllers for a particular installation site. In an example, an HVAC controller may be configured to control at least part of an HVAC system in accordance with an algorithm that includes equipment information pertaining to operation of the specific HVAC equipment forming the HVAC system as well as comfort information such as desired temperatures. In some cases, the HVAC controller may be configured to enable display of certain of the equipment information in a read-only fashion, and in some cases, certain of the equipment information that would be of interest to an inspector.

In a particular example of the disclosure, an HVAC controller that is configured to control at least part of an HVAC system of a building may include a controller that is configured to operate an algorithm that at least partially controls the HVAC system of the building. In some cases, the algorithm references a plurality of equipment setup parameters that setup the algorithm to control the particular HVAC equipment that is used in the HVAC system of the building as well as one or more comfort parameters that define one or more comfort set points used by the algorithm when controlling the at least part of the HVAC system of the building. The HVAC controller may include a user interface that is operably coupled to the controller, and the controller may be configured to receive via the user interface a plurality of parameter values each corresponding to one of the plurality of equipment setup parameters. The controller may be further configured to accept via the user interface a review request to review a predetermined smaller subset of the plurality of equipment setup parameters and their corresponding parameter values. In response to the accepted review request, the controller may provide on the user interface a read-only display of the predetermined smaller subset of the plurality of equipment setup parameters and their corresponding parameter values. The controller may be configured to operate the algorithm referencing the plurality of parameter values of the plurality of equipment setup parameters when controlling the at least part of the HVAC system of the building.

In another example of the disclosure, an HVAC controller that is configured to control at least a portion of an HVAC system of a building may include a touch screen display, a memory and a controller that is coupled to the touch screen display and to the memory. In some cases, the memory is for storing a plurality of equipment setup parameters that setup the HVAC controller to control the particular HVAC equipment that is used in the HVAC system of the building as well as one or more comfort parameters that define one or more comfort set points used by the HVAC controller when controlling the at least part of the HVAC system of the building. The controller may be configured to provide access to a setup menu for entering a plurality of equipment setup parameter values that each correspond to one of the plurality of equipment setup parameters. In some cases, the controller may be configured to provide access to a review menu in which a predetermined smaller subset of the plurality of equipment setup parameters are viewable in a read-only mode in which each of the predetermined smaller subset of the plurality of equipment setup parameters are displayable on the touch screen display but cannot be edited without exiting the review menu and accessing the setup menu. The controller may control at least a portion of the HVAC system based at least in part on the plurality of equipment setup parameters.

In another example of the disclosure, a method of confirming that a building's ventilation parameters meet certain building code requirements of a building having an HVAC system that includes HVAC equipment including ventilation equipment and an HVAC controller for controlling at least part of the HVAC system includes a setup mode and a ventilation review mode. In some cases, the HVAC controller may store a plurality of equipment setup parameters that setup the HVAC controller to control the particular HVAC equipment that is used in the HVAC system of the building. The plurality of equipment setup parameters may include ventilation related parameters and non-ventilation related parameters. The HVAC controller may also store one or more comfort parameters that define one or more comfort set points used by the HVAC controller when controlling the at least part of the HVAC system of the building. In the setup mode, the HVAC controller may allow a user to edit a parameter value for each of the plurality of equipment setup parameters. In the ventilation review mode, the HVAC controller displays to a user in a read-only mode the parameter values of the ventilation related parameters while not displaying the parameter values for the non-ventilation related parameters.

The above summary of some embodiments is not intended to describe each disclosed embodiment or every implementation of the present disclosure. The Figures, and Detailed Description, which follow, more particularly exemplify some of these embodiments.

BRIEF DESCRIPTION OF THE FIGURES

The disclosure may be more completely understood in consideration of the following description of various illustrative embodiments of the disclosure in connection with the accompanying drawings, in which:

FIGS. 9A and 9B provide examples of screens accessible via a VENT RATER advanced menu of FIG. 8B.

Figure 1:
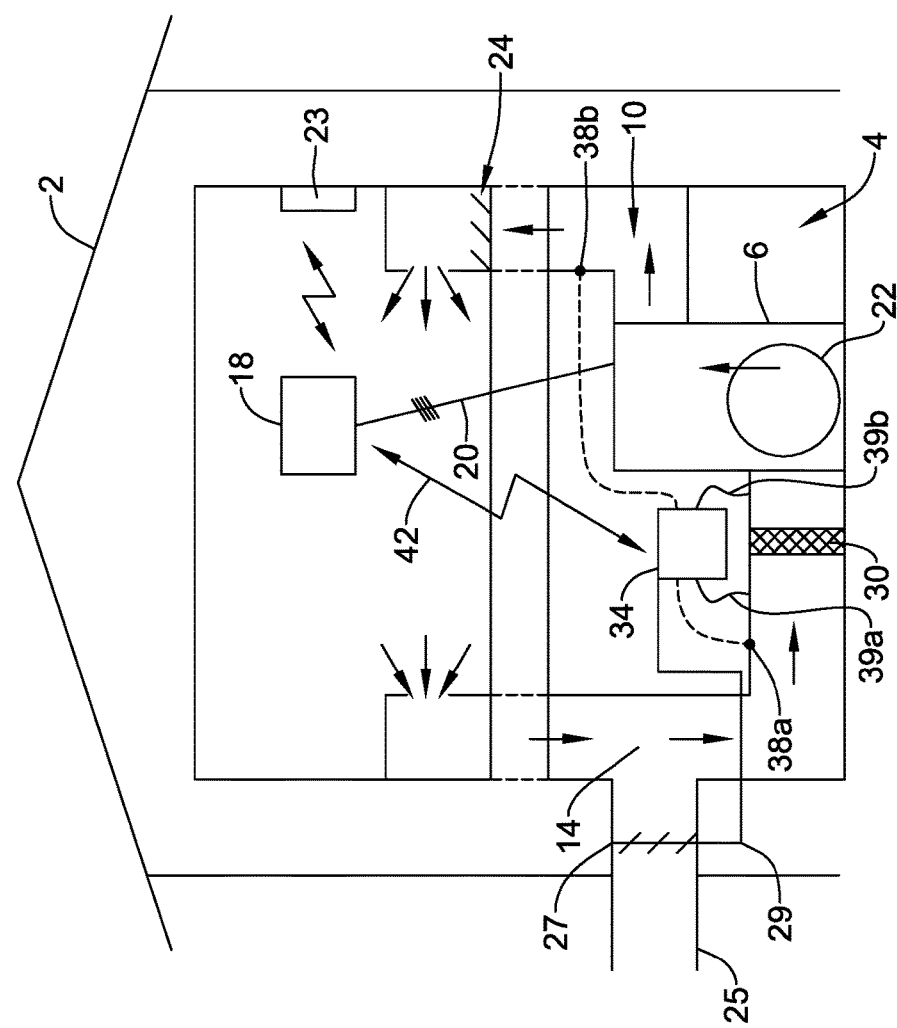
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and other systems. While HVAC systems with HVAC controllers are used as an example below, it should be recognized that the concepts disclosed herein can be applied to building automation systems more generally.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The type of HVAC system and/or the particular HVAC equipment used may depend on the geographic region. For example, natural gas fired forced air furnaces may be more common in the northern regions of the Unites States, while electric heat may be more common in the southwest. Boiler systems may be more common in the northeast region of the United States, as well as in Europe. These are just some examples.

The illustrative forced air type HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to one or more temperature sensor(s) for sensing ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 23 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may, in addition to controlling the HVAC under the direction of the thermostat, be configured to measure or detect a change in a given parameter between the return air side and the discharge air side of the HVAC system 4. For example, the equipment interface module 34 may measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature).

In some cases, the HVAC system 4 may include ventilation. There are a number of different types of ventilation systems. Examples include passive ventilation or mechanical ventilation. Mechanical ventilation may, for example, include an actuatable damper 27 that may be disposed within a duct 25 and connected to the return air duct 14. When the damper 27 is open, fresh air from outside may be pulled into the return air duct 14 and thus into the building 2. In some cases, the actuatable damper 27 may be connected via a control line 29 to the EIM 34. It will be appreciated that additional examples of mechanical ventilation include an ERV (energy recovery ventilator) or an HRV (heat recovery ventilator).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In some instances, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
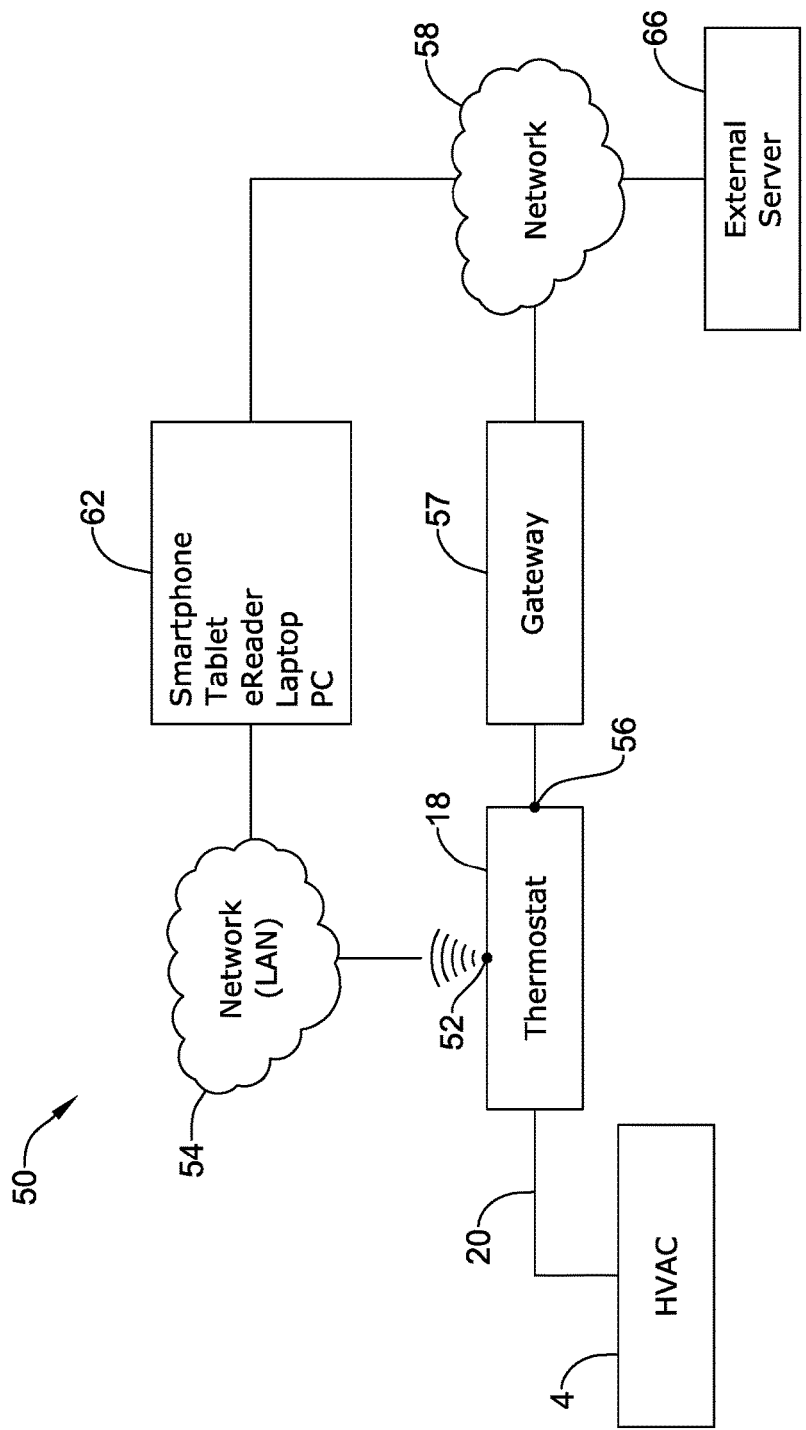
FIG. 2 is a schematic view of an illustrative HVAC control system that may facilitate access and/or control of the HVAC system of FIG. 1.

FIG. 2 is a schematic view of an illustrative HVAC control system 50 that facilitates remote access and/or control of the illustrative HVAC system 4 shown in FIG. 1. The HVAC control system 50 may be considered a building automation system or part of a building automation system. The illustrative HVAC control system 50 includes an HVAC controller, as for example, HVAC controller 18 (see FIG. 1) that is configured to communicate with and control one or more HVAC components 6 of the HVAC system 4. As discussed above, the HVAC controller 18 may communicate with the one or more HVAC components 6 of the HVAC system 4 via a wired or wireless link 20. Additionally, the HVAC controller 18 may communicate over one or more wired or wireless networks that may accommodate remote access and/or control of the HVAC controller 18 via another device such as a smart phone, tablet, e-reader, laptop computer, personal computer, key fob, or the like. As shown in FIG. 2, the HVAC controller 18 may include a first communications port 52 for communicating over a first network 54, and in some cases, a second communications port 56 for communicating over a second network 58. In some cases, communications over a second network 58 may pass through a gateway 57, but this is not required in all cases. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

In some cases, the HVAC controller 18 may be programmed to communicate over the second network 58 with an external web service hosted by one or more external web server(s) 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services sometimes including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like from the web server 66 over the second network 58. In some instances, the HVAC controller 18 may be configured to receive one or more user profiles having at least one operational parameter setting that is selected by and reflective of a user's preferences. In still other instances, the HVAC controller 18 may be configured to receive and/or download firmware and/or hardware updates such as, for example, device drivers from the web server 66 over the second network 58. Additionally, the HVAC controller 18 may be configured to receive local weather data, weather alerts and/or warnings, major stock index ticker data, traffic data, and/or news headlines over the second network 58. These are just some examples.

Depending upon the application and/or where the HVAC user is located, remote access and/or control of the HVAC controller 18 may be provided over the first network 54 and/or the second network 58. A variety of remote wireless devices 62 may be used to access and/or control the HVAC controller 18 from a remote location (e.g. remote from the HVAC Controller 18) over the first network 54 and/or second network 58 including, but not limited to, mobile phones including smart phones, tablet computers, laptop or personal computers, wireless network-enabled key fobs, e-readers, and/or the like. In many cases, the remote wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, an application program code (i.e. app) stored in the memory of the remote device 62 may be used to remotely access and/or control the HVAC controller 18. The application program code (app) may be downloaded from an external web service, such as the web service hosted by the external web server 66 (e.g. Honeywell's TOTAL CONNECT™ web service) or another external web service (e.g. ITUNES® or Google Play). In some cases, the app may provide a remote user interface for interacting with the HVAC controller 18 at the user's remote device 62. For example, through the user interface provided by the app, a user may be able to change operating parameter settings such as, for example, temperature set points, humidity set points, start times, end times, schedules, window frost protection settings, accept software updates and/or the like. Communications may be routed from the user's remote device 62 to the web server 66 and then, from the web server 66 to the HVAC controller 18. In some cases, communications may flow in the opposite direction such as, for example, when a user interacts directly with the HVAC controller 18 to change an operating parameter setting such as, for example, a schedule change or a set point change. The change made at the HVAC controller 18 may be routed to the web server 66 and then from the web server 66 to the remote device 62 where it may be reflected by the application program executed by the remote device 62.

In some cases, a user may be able to interact with the HVAC controller 18 via a user interface provided by one or more web pages served up by the web server 66. The user may interact with the one or more web pages using a variety of internet capable devices to effect a setting or other change at the HVAC controller 18, and in some cases view usage data and energy consumption data related to the usage of the HVAC system 4. In some cases, communication may occur between the user's remote device 62 and the HVAC controller 18 without being relayed through a server such as external server 66. These are just some examples.

Figure 3:
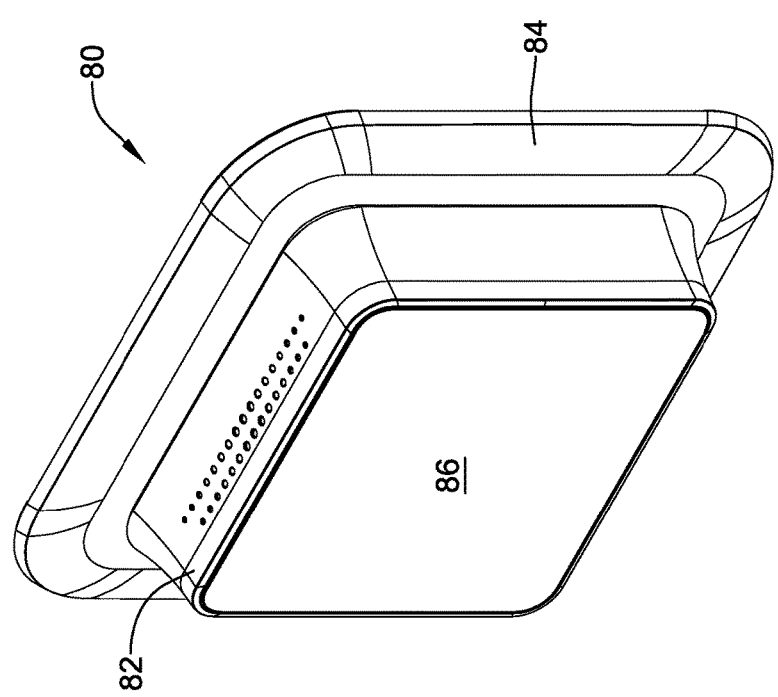
FIG. 3 is a perspective view of an illustrative thermostat assembly that may be used in the HVAC system of FIG. 1 or FIG. 2.

FIG. 3 is a perspective view of an illustrative thermostat assembly 80. In some instances, the thermostat assembly 80 may be considered as an example of the HVAC controller 18 referenced in FIGS. 1 and 2. In some instances, the thermostat assembly 80 may include a thermostat 82 and a trim piece 84. The thermostat 82 may include a user interface 86 which, in some cases, may be a touch screen display such as a fixed segment touch screen display or a dot matrix touch screen display. It will be appreciated that if the user interface 86 is a fixed segment touch screen display, the ability of the thermostat 82 to rearrange what is displayed on the user interface 86 may be somewhat limited. In some cases, it will be appreciated that a touch screen display may, for example, have any number of distinct touch points where the touch screen display is configured to sense that the touch point has been touched or is being touched. In some cases, the touch screen display may have a relatively limited number of distinct touch points in order to reduce costs, for example.

Figure 4:
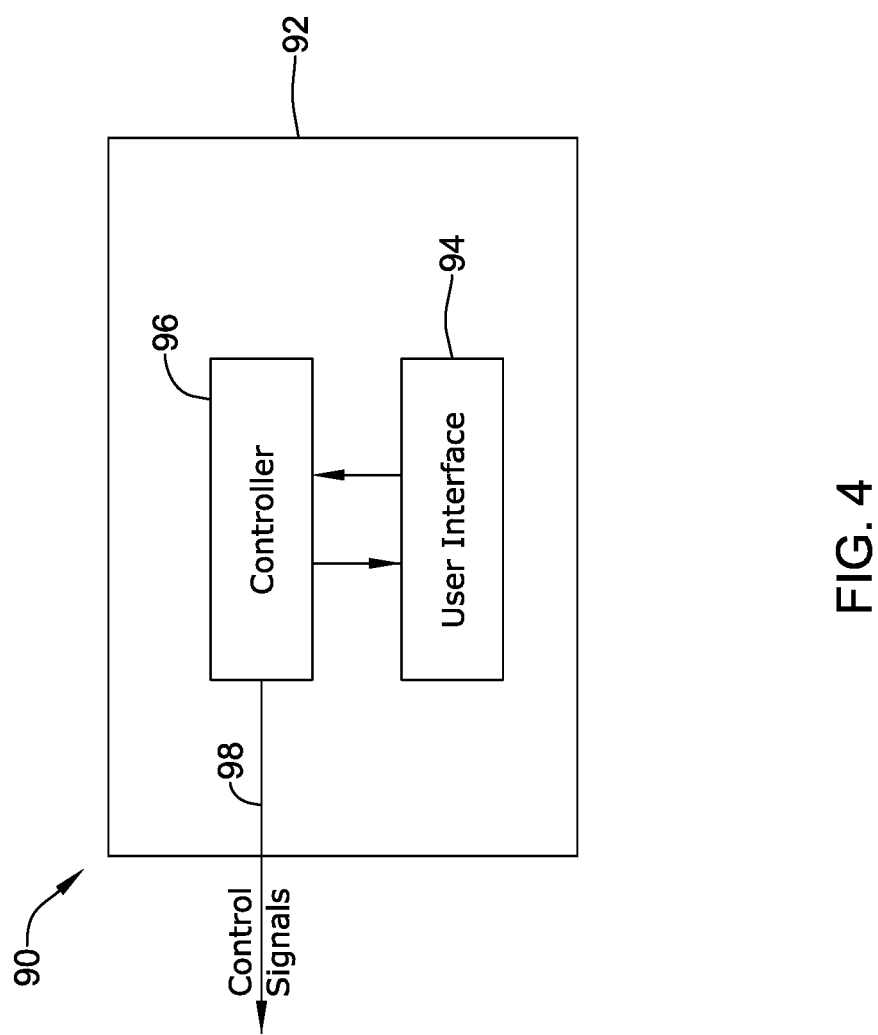
FIG. 4 is a schematic view of an illustrative HVAC controller that may, for example, form part of the HVAC system of FIG. 1 or FIG. 2.

FIG. 4 is a schematic view of an illustrative HVAC controller 90 that may, for example, be configured to control one or more HVAC components (such as but not limited to the HVAC component(s) 6 shown in FIG. 1 as part of the HVAC system 4) in accordance with one or more comfort parameters that define desired temperatures for particular time periods. In some cases, the HVAC controller 90 may operate in accordance with a programmable schedule. In some cases, the programmable schedule may include a plurality of schedule periods. For example, in some cases, the programmable schedule may include up to four different time periods each day. In some cases, these four time periods may be identified as WAKE, AWAY, HOME and SLEEP. In some instances, the programmable schedule may include additional time periods. In some cases, the programmable schedule may include fewer than four distinct time periods.

In some instances, the programmable schedule may be known as a 7 day schedule, in which each of the seven days of the week may be uniquely programmed but are not required to be. In some cases, the programmable schedule may be known as a 5-2 schedule, in which each of the weekdays Monday through Friday share a first programming schedule and the weekend days Saturday and Sunday share a second programming schedule. In some cases, the programmable schedule may be known as a 5-1-1 schedule, in each of the weekdays Monday through Friday share a first programming schedule, and Saturday and Sunday each can have their own unique schedule.

In some cases, the HVAC controller 90 may include a housing 92. In some instances, the housing 92 may be considered as forming the outer structure of the thermostat 82 (FIG. 3), although this is not required in all cases. A user interface 94 may be disposed within the housing 92 in such a way as to be accessible from outside of the housing 92. In some cases, for example, the user interface 94 may form a portion of an outer surface, such as the front of the outer surface, of the housing 92. In some cases, the user interface 94 may be a touch screen display. In some instances, the user interface 94 may be a fixed segment touch screen display, and may for example have a limited number of distinct touch points. In some cases, the user interface 94 may be a dot matrix touch screen display, and in some cases essentially an entire surface of the user interface 94 may provide touch points.

The illustrative HVAC controller 90 includes a controller 96 that may be configured to operate an algorithm that at least partially controls the HVAC system of the building and output one or more control signals 98 to the HVAC system. In some cases, the algorithm may reference or otherwise utilize a plurality of equipment setup parameters that setup the algorithm to control the particular HVAC equipment that is used in the HVAC system of the building. These equipment setup parameters may, for example, be defined and parameter values for these equipment setup parameters may be entered during an initial configuration of the HVAC controller 90. In some cases, the algorithm may also reference or otherwise utilize one or more comfort parameters that define one or more comfort set points used by the algorithm when controlling the at least part of the HVAC system of the building.

In some cases, the controller 96 may be configured to receive via the user interface 94 a plurality of parameter values, each of the plurality of parameter values corresponding to one of the plurality of equipment setup parameters. In some cases, the controller 96 may be configured to allow a user to make a review request, such as via the user interface 94, to review a predetermined smaller subset of the plurality of equipment setup parameters and their corresponding parameter values. In some cases, and in response to the request, the controller 96 may be configured to provide on the user interface 94 a read-only display of the predetermined smaller subset of the plurality of equipment setup parameters and their corresponding parameter values. In some cases, the controller 90 may be configured to display on the user interface 94 a review menu in response to the review request that allows a user to review in a read-only mode the predetermined smaller subset of the plurality of equipment setup parameters and their corresponding parameter values without reviewing the plurality of equipment setup parameters that are not part of the predetermined smaller subset of the plurality of equipment setup parameters.

It will be appreciated that the controller 90 operates the algorithm referencing the plurality of parameter values of the plurality of equipment setup parameters when controlling the at least part of the HVAC system of the building.

In some cases, the plurality of comfort parameters that may be accounted for within the algorithm being run by the controller 90 include, but are not limited to, one or more of a heating set point, a cooling set point, a heating set point schedule, a cooling set point schedule, a humidity set point, and an air quality set point. It will be appreciated that the controller 90 may be configured to operate the algorithm referencing the one or more comfort set points defined by the one or more comfort parameters when controlling the at least part of the HVAC system of the building.

In some cases, the plurality of equipment setup parameters may include both ventilation related parameters and non-ventilation parameters. In some cases, the predetermined smaller subset of the plurality of equipment setup parameters that is displayed in read-only fashion may include the ventilation related parameters. The ventilation parameters may include, for example, one or more of a run time percentage, a ventilation type, a ventilation rate, a number of bedrooms, a building square footage and a ventilation priority type. Illustrative but non-limiting examples of ventilation priority types include a hi temperature lockout, a low temperature lockout and/or a high dew point lockout. These are just examples.

The non-ventilation parameters may include, for example, System Selection (e.g. conventional or heat pump), Heat Fan Operation (e.g. fossil fuel or electric), Pre-Occupancy Purge Duration (0 to 3 hours), Reversing Valve O/B (O for O/B on Cool or 1 for O/B on Heat), and Compressor CPH (Cycles Per Hour), which can range from 1 to 6 cycles per hour). Additional examples include Remote Temperature Sensor (yes or no), Heat Pump Compressor Lockout (0, 15, 20, 25), Minimum Compressor Off Time (0 to 5 minutes), Extended Fan-On Time Heat (0 or 90 seconds), Extended Fan-On Time Cool (0 or 40 seconds) and Recover Heat Ramp Rate (0 to 20 degrees F. per hour).

In some cases, the controller 90 may be configured to sequentially display one or more of these ventilation related parameters on the user interface 94. For example, a sequence of read-only display screens may be displayed on the user interface 94, each of the read-only display screens displaying one of the predetermined smaller subset of the plurality of equipment setup parameters and a corresponding parameter value. In some cases, more than one, and in some cases all, of the ventilation related parameters are displayed on a single screen. In some cases, the controller 90 may be configured to display a single screen on the user interface 94 that informs the user as to whether the ventilation related parameters are correctly configured to meet a predetermined building code standard (e.g. ASHRE Ventilation Standard). For example, the controller 90 may simply display a single screen reading "MEETS STANDARDS" or a similar message. While a user may decide to drill down and review one or more of the individual ventilation-related parameters in a read-only fashion, they are not required to. An inspector can quickly determine that the ventilation settings meet a desired standard and are correct.

In some cases, the controller 90 may be configured to display on the user interface 94 a setup menu that allows a user to enter, and the controller 90 to receive, one or more of the plurality of parameter values corresponding to the plurality of equipment setup parameters. In some cases, the controller 90 may be configured to display on the user interface 94 an edit menu that allows a user to edit one or more of the plurality of parameter values corresponding to the plurality of equipment setup parameters. This may occur, for example, after an installer has reviewed the settings and perhaps determined that one or more changes may be appropriate.

Figure 5:
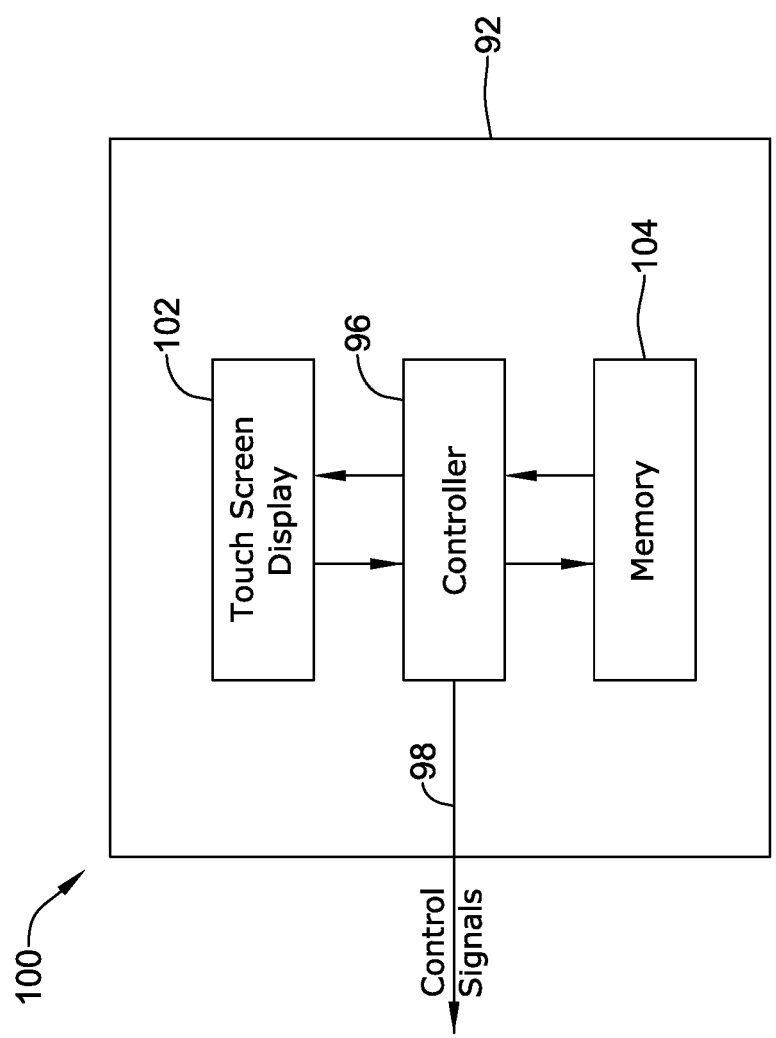
FIG. 5 is a schematic view of an illustrative HVAC controller that may, for example, form part of the HVAC system of FIG. 1 or FIG. 2.

FIG. 5 is a schematic view of an illustrative HVAC controller 100 that may, for example, be configured to control one or more HVAC components (such as but not limited to the HVAC component(s) 6 shown in FIG. 1 as part of the HVAC system 4) in accordance with one or more comfort parameters that define desired temperatures for particular time periods. In some cases, the HVAC controller 100 may be considered as including any or all of the functionality described with respect to the HVAC controller 90, and vice versa. In some cases, the HVAC controller 100 may operate in accordance with a programmable schedule.

In some cases, the HVAC controller 100 may include a housing 92. In some instances, the housing 92 may be considered as forming the outer structure of the thermostat 82 (FIG. 3), although this is not required in all cases. A touch screen display 102 may be disposed within the housing 92 in such a way as to be accessible from outside of the housing 92. In some cases, for example, the touch screen display 102 may form a portion of an outer surface, such as the front of the outer surface, of the housing 92. In some cases, the touch screen display 102 may be a fixed segment touch screen display, and may for example have a limited number of distinct touch points. In some cases, the touch screen display 102 may be a dot matrix touch screen display, and in some cases essentially an entire surface of the touch screen display 102 may provide touch points.

The illustrative HVAC controller 100 includes the controller 96 that may be configured to operate an algorithm that at least partially controls the HVAC system of the building and output one or more control signals 98 to the HVAC system. In some cases, the algorithm may reference or otherwise utilize a plurality of equipment setup parameters that setup the algorithm to control the particular HVAC equipment that is used in the HVAC system of the building. These equipment setup parameters may, for example, be defined and parameter values for these equipment setup parameters may be entered during an initial configuration of the HVAC controller 90. In some cases, the algorithm may also reference or otherwise utilize one or more comfort parameters that define one or more comfort set points used by the algorithm when controlling the at least part of the HVAC system of the building.

The HVAC controller 100 may include a memory 104 in order to store a plurality of equipment setup parameters that setup the HVAC controller to control the particular HVAC equipment that is used in the HVAC system of the building as well as one or more comfort parameters that define one or more comfort set points used by the HVAC controller when controlling the at least part of the HVAC system of the building. In some cases, the controller 96 may be operably coupled to the touch screen display 102 and to the memory 104. In some cases, the controller 96 may be configured to provide access to a setup menu for entering a plurality of equipment setup parameter values each corresponding to one of the plurality of equipment setup parameters as well as providing access to a review menu in which a predetermined smaller subset of the plurality of equipment setup parameters are viewable in a read-only mode in which each of the predetermined smaller subset of the plurality of equipment setup parameters are displayable on the touch screen display 102 but cannot be edited without exiting the review menu and accessing the setup menu. The controller 96 may be configured to control at least a portion of the HVAC system based at least in part on the plurality of equipment setup parameters.

In some instances, the controller 96 may be configured to display an advanced menu. In some cases, the review menu is an option on the advanced menu. In some cases, the setup menu is an option on the advanced menu. In some cases, the controller 96 may display on the touch screen display 102 a home screen including a menu button. A user may be allowed to access an advanced menu by touching the menu button for at least a predetermined period of time. Once the advanced menu has been reached, the user may be allowed to select the review menu via the advanced menu and to scroll through a plurality of screens within the review menu.

Figure 6:
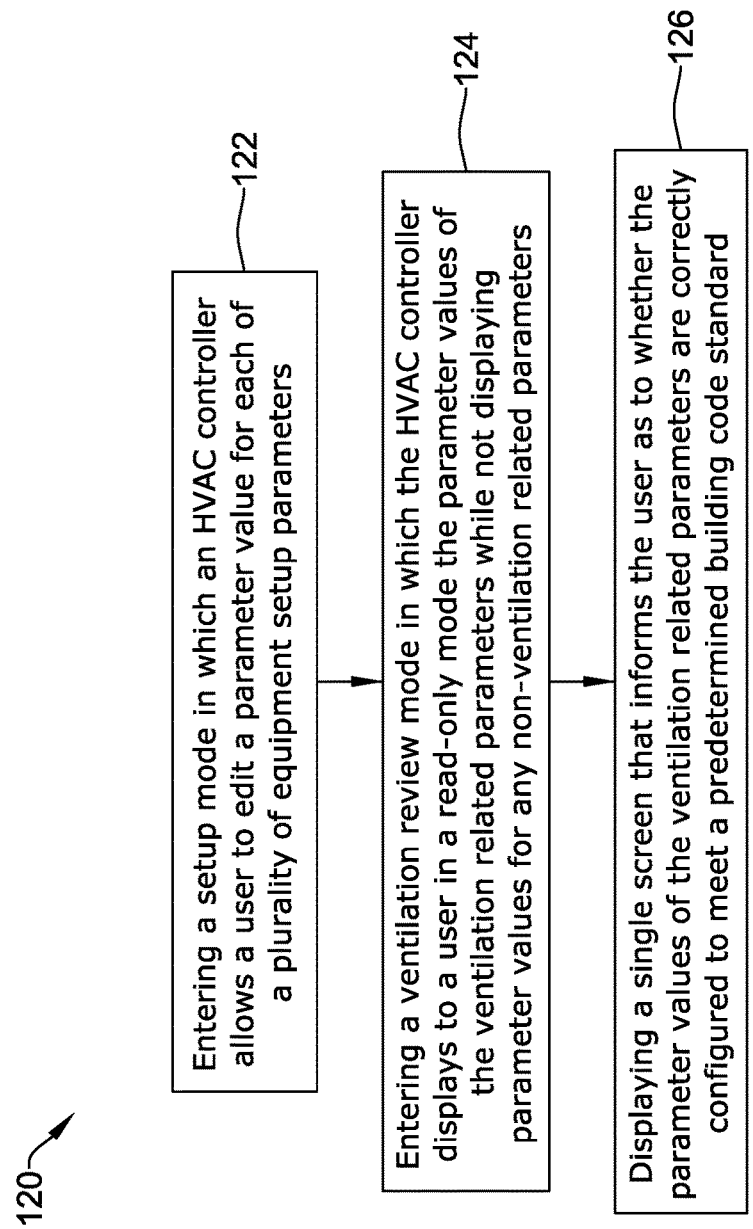
FIG. 6 is a flow diagram showing an illustrative method of confirming ventilation standards using an HVAC controller such as those shown in FIGS. 4 and 5.

FIG. 6 is a flow diagram showing an illustrative but non-limiting example of a method 120 for confirming that a building's ventilation parameters meet building code requirements of a building having an HVAC system that includes HVAC equipment including ventilation equipment, and also includes an HVAC controller such as the HVAC controller 90 (FIG. 4) or the HVAC controller 100 (FIG. 5). The HVAC controller may store a plurality of equipment setup parameters that setup the HVAC controller to control the particular HVAC equipment that is used in the HVAC system of the building. The plurality of equipment setup parameters include ventilation related parameters and non-ventilation related parameters. The HVAC controller may also store one or more comfort parameters that define one or more comfort set points used by the HVAC controller when controlling the at least part of the HVAC system of the building.

As generally indicated at block 122, the method 120 includes entering a setup mode in which the HVAC controller allows a user to edit a parameter value for each of the plurality of equipment setup parameters. In block 124, a ventilation review mode may be entered in which the HVAC controller displays to a user in a read-only mode the parameter values of the ventilation related parameters while not displaying the parameter values for the non-ventilation related parameters. In some cases, when in the ventilation review mode, the HVAC controller displays in sequence the parameter value for each of the ventilation related parameters. In some cases, more than one, and in some cases all, of the ventilation related parameters are displayed on a single screen. In some cases, and as seen at block 126, a single screen may be displayed that informs the user as to whether the parameter values of the ventilation related parameters are correctly configured to meet a predetermined building code standard. In some cases, block 124 may be excluded, and control may for example pass from block 122 directly to block 126, although this is not required in all cases.

Figure 7:
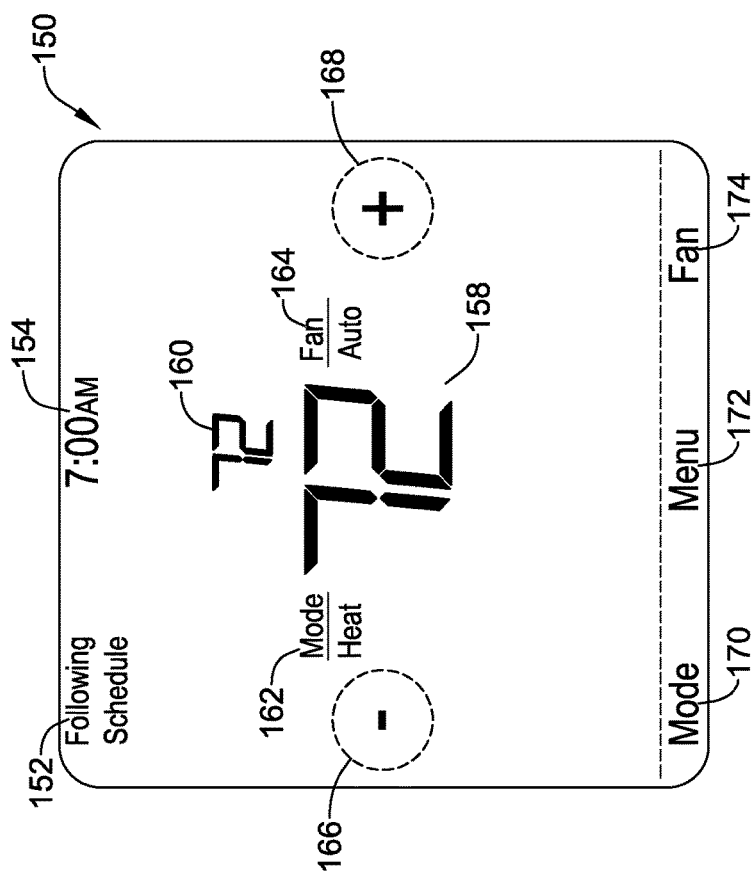
FIG. 7 schematically shows a home screen that may be displayed by any of the HVAC controllers of FIGS. 3-5.

FIG. 7 shows a home screen 150 that may be generated and displayed by the HVAC controller 90 (FIG. 4) and/or the HVAC controller 100 (FIG. 5). In some cases, the home screen 150 as shown in FIG. 7 may include a FOLLOWING SCHEDULE icon 152, which indicates to the user that the HVAC controller 90 and/or the HVAC controller 100 is operating the HVAC equipment 4 (FIG. 1 or FIG. 2) in accordance with whatever programmable schedule has been entered into the HVAC controller 90. In some instances, the home screen 150 may be considered as being a starting point from which a user may view various scheduling parameters, edit various scheduling parameters, make changes to equipment settings, and the like. The home screen 150 includes, for example, a time icon 154 that indicates a present time so that the user can verify that the HVAC controller 90 is set to the correct time as this can negatively impact a programmable schedule if the time is not set correctly. A Wi-Fi icon 156 indicates that the HVAC controller 90 is, for example, successfully connected to a local network.

Across the center of the home screen 150, the HVAC controller 90 may be seen as displaying a current temperature icon 158 and a current temperature setpoint icon 160. In some cases, the current temperature icon 158 is displayed in a larger or otherwise more noticeable font so that the user can easily read the current temperature. Display of the current temperature setpoint icon 160 provides the user with quick verification that the system is working correctly, i.e., that the current temperature matches the temperature setpoint. This also enables the user to see, via display of the current temperature setpoint, if the current temperature setpoint is as expected. For example, if the HVAC controller 90 is operating under a programmable schedule that expects the house to be empty at a particular time of day, the temperature setpoint may be chosen more for energy efficiency than for comfort. If a person has unexpectedly stayed home that day, they will be able to see that the temperature setpoint has been automatically adjusted for energy efficiency, and they can temporarily adjust the temperature setpoint to maintain their comfort without waiting for the house temperature to drop (or increase) to that energy efficient setting.

The illustrative home screen 150 also includes a mode icon 162 that informs the user what mode the system is in, such as heat mode (as illustrated), cool mode, or system off. A fan icon 164 informs the user as to what mode the system fan is in. In some cases, the fan mode may be AUTO, meaning that the fan only runs when the conditioning equipment (e.g. heater, air conditioner, humidifier, etc.) is running. If the system is in heat mode (as shown), for example, having the fan mode in AUTO means the fan will only run when the furnace burner is running (plus a short time period before burner ignition and a short time period after the burner goes off). If in cool mode, and the fan mode is AUTO, the fan will only run when the air conditioning is running (plus a short time period after the air conditioner goes off). In some cases, the fan mode may be ON, in which case the fan runs continuously to help circulate air within the house, or perhaps to accommodate an air exchanger. A MINUS button 166 and a PLUS button 168, which may for example represent the previously discussed MINUS button 124 (FIG. 6B) and the previously discussed PLUS button 126, may be used to alter the value of variously displayed system and schedule parameters. In some cases, it will be appreciated that the MINUS button 166 and/or the PLUS button 168 may each coincide with touch points formed within the touch screen display 94.

Across the bottom of the home screen 150, the HVAC controller 90 may be seen as displaying a MODE button 170, a MENU button 172 and a FAN button 174. In some cases, the MODE button 170, the MENU button 172 and/or the FAN button 174 may each coincide with touch points formed within the touch screen display 94. It will be appreciated that in some cases, the MODE button 170 may, for example, be used to change the system from heat mode to cool mode, or cool mode to heat mode, or from heat mode to OFF or from cool mode to OFF. The FAN button 174 may be used to change the fan mode from ON to AUTO, or from AUTO to ON, for example. The MENU button 172 enables a user to reach various menus that are programmed into the HVAC controller 90 and thus can be displayed on the display 94. In some cases, one of the menus that may be reached via the MENU button 172 is a schedule menu for programming a schedule. Other menus that may be accessible via the MENU button 172 include but are not limited to ALERTS, LOCK SCREEN, WIFI settings, BACKLIGHT settings, RECOVERY, CLOCK, DATE, CLEAN SCREEN, TEMP SCALE (F or C), RESET, EQUIPMENT STATUS, DEVICE INFO and the like. A user may scroll through these menu options via a BACK button 184 and a FORWARD button 186.

Figure 8A:
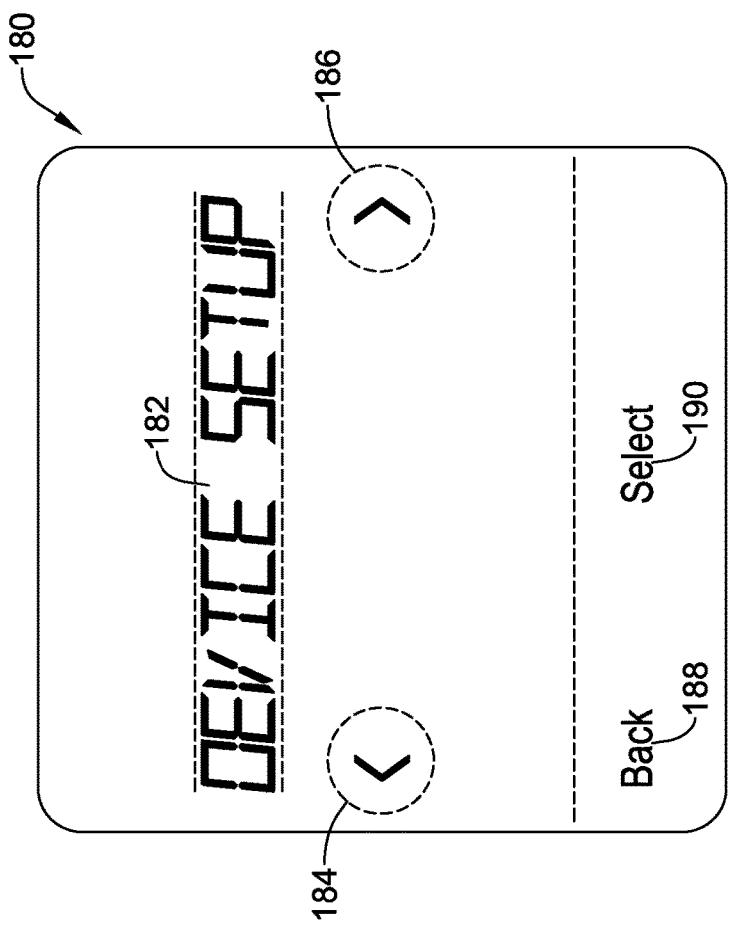
FIGS. 8A through 8C show examples of screens accessible via an advanced menu that may be displayed by any of the HVAC controllers of FIGS. 3-5.
Figure 8B:
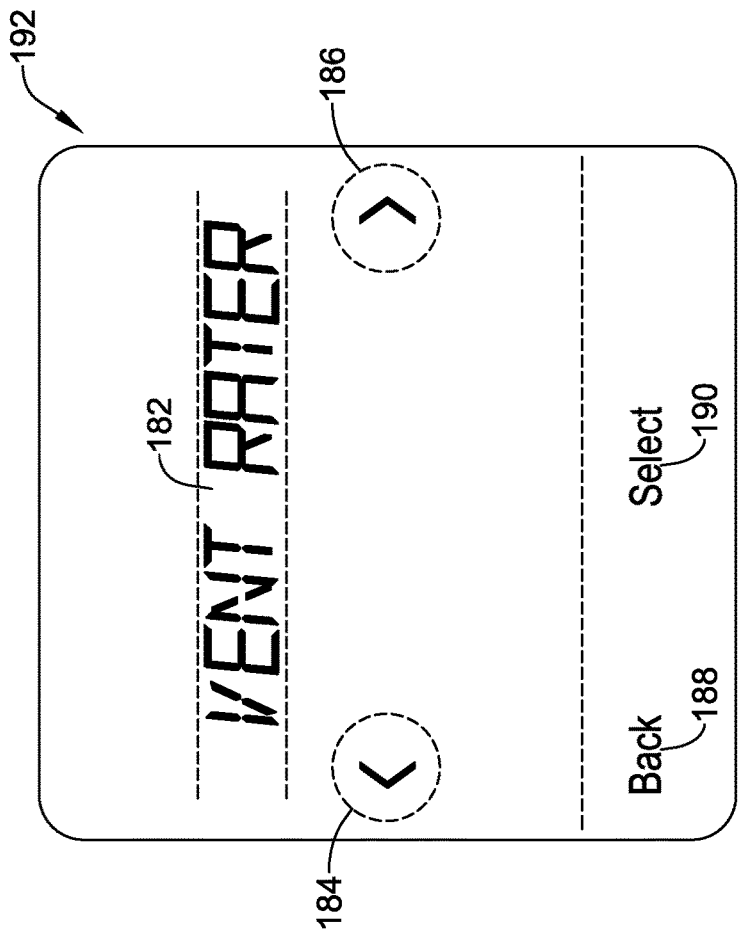
Figure 8C:
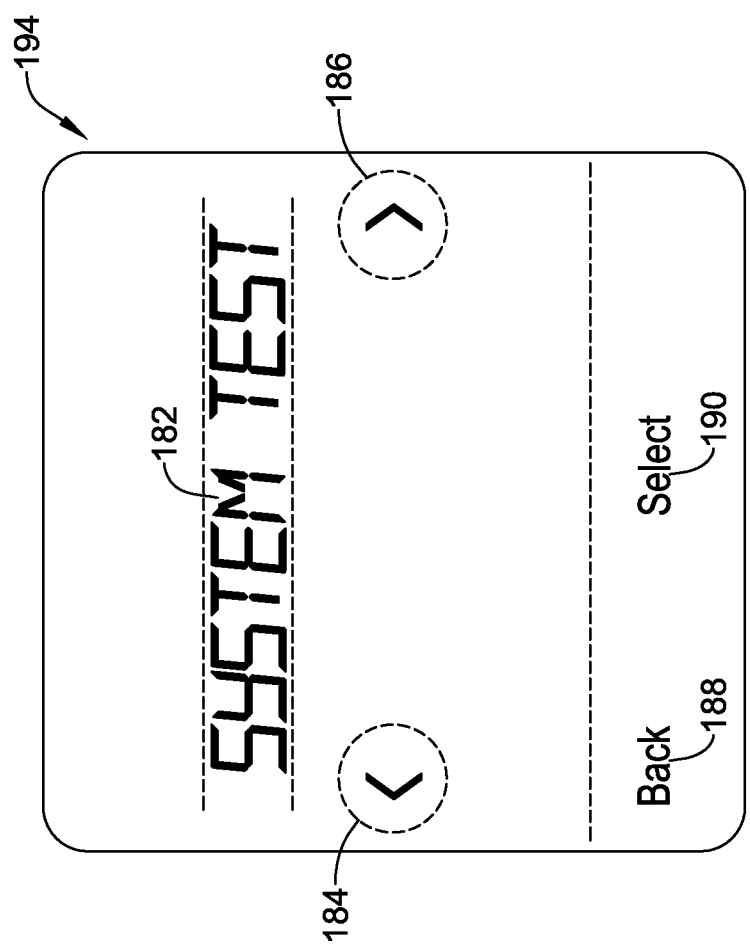

In some cases, an advanced menu may be reached by pressing and holding down the MENU button 172 in FIG. 7 for a predetermined length of time. In some cases, for example, an advanced menu may be reached by pressing and holding down the MENU button 172 of FIG. 7 for a period of five seconds. FIGS. 8A through 8C show illustrative but non-limiting examples of menus that may be reached via the advanced menu. FIG. 8A shows a screen 180 that provides an example of a menu. The screen 180 includes a menu identifier 182 that the user can use to determine if a particular menu is the menu they are interested in or not. The BACK button 184 and the FORWARD button 186 may be used to scroll forwards and backwards between the advanced menu options. A back button icon 188 may be used to return to the home screen 150 (FIG. 7). A select button icon 190 may be used to select the displayed menu. The screen 180 enables the user to select the DEVICE SETUP menu, as indicated by the menu identifier 182.

From FIG. 8A, pressing the FORWARD button 186 may cause the HVAC controller 90 and/or the HVAC controller 100 to display a screen 192, as shown in FIG. 8B. The screen 192 enables a user to select the VENT RATER menu, as indicated by the menu identifier 182. The select button icon 190 may be used to enter the VENT RATER menu, for example. From FIG. 8B, pressing the BACK button 184 would cause the screen 180 of FIG. 8A to be displayed. Alternatively, pressing the FORWARD button 186 from FIG. 8B may cause the HVAC controller 90 and/or the HVAC controller 100 to display a screen 194, as shown in FIG. 8C. The screen 194 enables a user to select the SYSTEM TEST menu, as indicated by the menu identifier 182.

In some cases, selecting the In some cases, selecting the Device Setup menu, as shown in FIG. 8A, may allow the installer to edit at least some of the device and/or equipment setup parameters. In some cases, for example, the Device Setup menu may enable the controller 96 to display an edit menu that permits the installer or inspector to edit one or more of the equipment setup parameters. In some cases, the Device Setup menu may enable an installer to initially scroll through the equipment setup parameters and enter appropriate parameter values for the equipment setup parameters. In some instances, the Device Setup menu may enable an installer or inspector to go in and make changes to previously entered parameter values for the equipment setup parameters.

Returning to FIG. 8B, pressing or otherwise selecting the select button icon 190 may cause the HVAC controller 90 and/or the HVAC controller 100 to display a screen 200, as shown in FIG. 9A. The screen 200 of FIG. 9A includes a message indicator 202. In some cases, the message indicator 202 may display a message that is too long to fit on the screen 200 at one time. In some cases, a fixed segment touch screen display may limit how many characters are displayed at a given time. In some instances, the message indicator 202 may include a scroll icon 204, which indicates to the user that the message contained within the message indicator 202 is too long to be displayed in its entirety, and thus the message indicator 202 will scroll through the message. As shown in FIG. 9A, the message indicator 202 says "MEETS ASHR". As the message scrolls, the message indicator 202 may provide the entire message, which may for example say "MEETS ASHRAE 2010" or perhaps "MEETS ASHRAE 2013". In some cases, it may read "ASHRAE NOT MET" if there is a problem with one or more of the ventilation related settings. From FIG. 9A, if the user or inspector is satisfied, they can return to the previous menu simply by pressing a done button icon 206.

If the user or inspector wants to individually review the specific settings, they can move forwards and backwards through a plurality of screens, with each screen showing a particular ventilation related equipment parameter as well as a value for each particular ventilation related equipment parameter, by simply using the BACK button 184 and the FORWARD button 186, as desired. In some cases, the parameters are displayed in a read only mode, so that an inspector cannot inadvertently change a value of the parameters. In some cases, when the inspector enters the VENT RATER menu by selecting button 190, all of the parameters displayed in the VENT RATER menu are presented in a read-only mode.

Figure 9B:
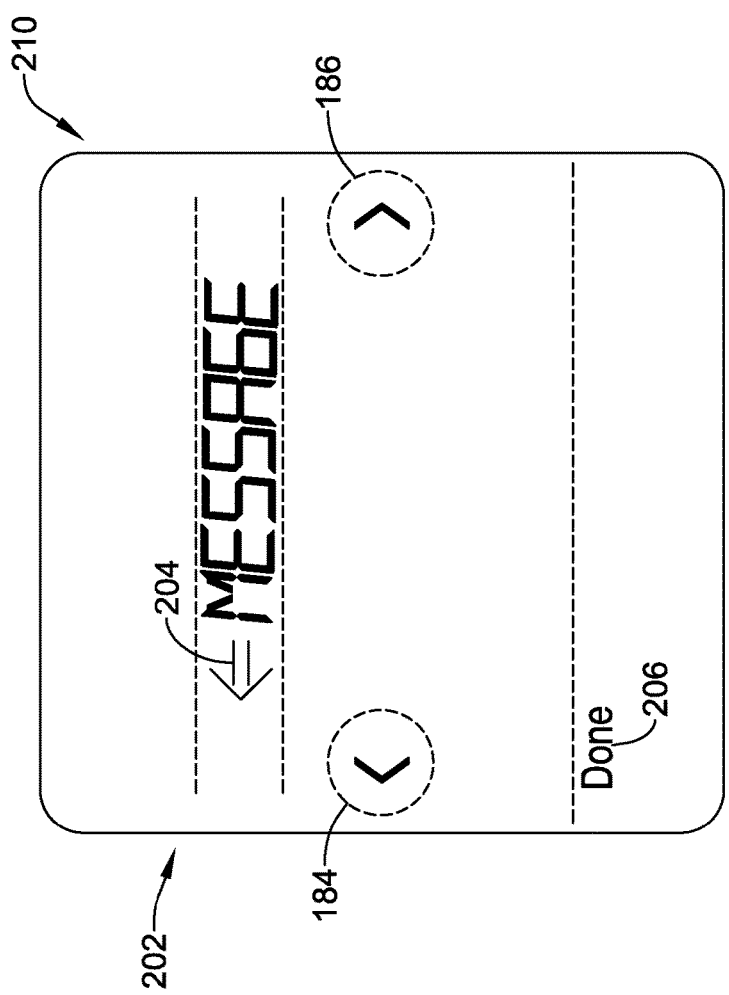

FIG. 9B generically shows a screen 210 in which the message indicator 202 generically reads "MESSAGE". It will be appreciated that a number of different ventilation related equipment parameters may be represented in the message indicator 202. Rather than show individual screens with a portion of each message shown, some example messages as well as their value ranges are shown in the Table below:

| Message | Range or Setting |
| --- | --- |
| RUN TIME PERCENTAGE | 0 to 100 |
| VENT TYPE | none |
|  | ERV/HRV[#] |
|  | Passive |
|  | Fresh Air Damper |
| VENT RATE | 30 to 350 CFM |
| BEDROOMS | 1 to 6 |
| SIZE | 1000 to 5000 ft$^2$ |
| VENT PRIORITY | Lockouts |
|  | ASHRAE |
| HI TEMP LOCKOUT | 80 to 110 F. (26.5 to 43.5 C.) |
| LOW TEMP LOCKOUT | −20 to 40 F. (−29.0 to 4.5 C.) |
| HI DEW LOCKOUT | 65 to 85 F. (18.5 to 29.5 C.) |

[#]ERV is energy recovery ventilation while HRV is heat recovery ventilation

With respect to FIG. 9B, if for example the message indicator 202 reads "VENT RATE", in combination with a numerical setting, pressing the BACK button 184 may cause the message indicator 202 to display "VENT TYPE" along with a numerical setting. Pressing the FORWARD button 186 in FIG. 9B while the message indicator 202 reads "VENT RATE" may cause the message indicator 202 to display "BEDROOMS" along with a numerical setting. It will be appreciated that these settings can be scrolled through using the BACK button 184 and/or the FORWARD button 186, as desired. Selecting the done button icon 206 will cause the HVAC controller 90 and/or the HVAC controller 100 to revert one level in the menu and would return to the screen 192 shown in FIG. 8B.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. An HVAC controller configured to control at least part of an HVAC system of a building, the HVAC controller comprising:
   a controller configured to operate an algorithm that at least partially controls the HVAC system of the building, the algorithm referencing:
   a plurality of equipment setup parameters that setup the algorithm to control the particular HVAC equipment that is used in the HVAC system of the building, the plurality of equipment setup parameters including ventilation related equipment setup parameters and non-ventilation related equipment setup parameters; and
   one or more comfort parameters that define one or more comfort set points used by the algorithm when controlling the at least part of the HVAC system of the building;
   a user interface operably coupled to the controller;
   the controller configured to enter a setup mode, wherein the setup mode is configured to receive via the user interface edits to a plurality of parameter values each corresponding to one of the plurality of equipment setup parameters;
   the controller further configured to accept via the user interface a review request to enter a read-only review mode, the read-only review mode configured to provide a review of a predetermined smaller subset of the plurality of equipment setup parameters and their corresponding parameter values, the predetermined smaller subset of the plurality of equipment setup parameters including the ventilation related equipment setup parameters but not the non-ventilation related equipment setup parameters, wherein the parameter values of the predetermined smaller subset of the plurality of equipment setup parameters cannot be edited without exiting the read-only review mode;
   in response to the accepted review request, the controller is configured to provide on the user interface a read-only display of the predetermined smaller subset of the plurality of equipment setup parameters and their corresponding parameter values; and
   the controller is further configured to operate the algorithm referencing the plurality of parameter values of the plurality of equipment setup parameters including the ventilation related equipment setup parameters and the non-ventilation related equipment setup parameters when controlling the at least part of the HVAC system of the building.

2. The HVAC controller of claim 1, wherein the controller is configured to display on a single screen whether the ventilation related equipment setup parameters are correctly configured to meet a predetermined building code standard.

3. The HVAC controller of claim 1, wherein the ventilation related equipment setup parameters comprise one or more of a run time percentage, a ventilation type, a ventilation rate, a number of bedrooms, a building square footage and a ventilation priority type.

4. The HVAC controller of claim 3, wherein the ventilation priority type comprises a hi temperature lockout, a low temperature lockout and/or a high dew point lockout.

5. The HVAC controller of claim 1, wherein the plurality of comfort parameters comprise one or more of a heating set point, a cooling set point, a heating set point schedule, a cooling set point schedule, a humidity set point, and an air quality set point.

6. The HVAC controller of claim 1, wherein providing the read-only display on the user interface comprises providing a sequence of read-only display screens each for displaying one of the predetermined smaller subset of the plurality of equipment setup parameters and the corresponding parameter value.

7. The HVAC controller of claim 1, wherein the controller is configured to operate the algorithm referencing the one or more comfort set points defined by the one or more comfort parameters when controlling the at least part of the HVAC system of the building.

8. The HVAC controller of claim 1, wherein the controller is configured to display on the user interface a setup menu in the setup mode that allows a user to enter, and the controller to receive, edits to one or more of the plurality of parameter values corresponding to the plurality of equipment setup parameters.

9. The HVAC controller of claim 1, wherein the controller is configured to display on the user interface an edit menu in the setup mode that allows a user to edit one or more of the plurality of parameter values corresponding to the plurality of equipment setup parameters.

10. The HVAC controller of claim 1, wherein the controller is configured to display on the user interface a review menu in the review mode that allows a user to review in the read-only review mode the predetermined smaller subset of the plurality of equipment setup parameters and their corresponding parameter values without reviewing the plurality of equipment setup parameters that are not part of the predetermined smaller subset of the plurality of equipment setup parameters.

11. An HVAC controller configured to control at least a portion of an HVAC system of a building, the HVAC controller comprising:
a touch screen display;
a memory for storing:
a plurality of equipment setup parameters that setup the HVAC controller to control the particular HVAC equipment that is used in the HVAC system of the building, including ventilation related equipment setup parameters and non-ventilation related equipment setup parameters; and
one or more comfort parameters that define one or more comfort set points used by the HVAC controller when controlling the at least part of the HVAC system of the building;
a controller coupled to the touch screen display and the memory;
the controller configured to provide access to a setup menu for entering a plurality of equipment setup parameter values each corresponding to one of the plurality of equipment setup parameters;
the controller further configured to provide access to a ventilation review menu in which the ventilation related equipment setup parameters are viewable in a read-only mode in which each of the ventilation related equipment setup parameters are displayable on the touch screen display but cannot be edited without exiting the ventilation review menu and accessing the setup menu, and where the non-ventilation related equipment setup parameters are not displayed; and
the controller further configured to control at least a portion of the HVAC system based at least in part on the plurality of equipment setup parameters.

12. The HVAC controller of claim 11, wherein the controller is further configured to display an advanced menu, and the ventilation review menu is an option on the advanced menu.

13. The HVAC controller of claim 12, wherein the setup menu is also an option on the advanced menu.

14. The HVAC controller of claim 11, wherein the controller is configured to:
display a home screen including a menu button;
allow a user to access an advanced menu by touching the menu button for at least a predetermined period of time; and
allow a user to select the ventilation review menu via the advanced menu and to scroll through a plurality of screens within the ventilation review menu.

15. The HVAC controller of claim 11, wherein the ventilation related equipment setup parameters comprise one or more of a run time percentage, a ventilation type, a ventilation rate, a number of bedrooms, building square footage and ventilation priority type.

16. A method of confirming that a building's ventilation parameters meet building code requirements of a building, the building including an HVAC system that includes HVAC equipment including ventilation equipment, and also includes an HVAC controller for controlling at least part of the HVAC system, the HVAC controller storing a plurality of equipment setup parameters that setup the HVAC controller to control the particular HVAC equipment that is used in the HVAC system of the building, the plurality of equipment setup parameters including ventilation related equipment setup parameters and non-ventilation related equipment setup parameters, the HVAC controller also storing one or more comfort parameters that define one or more comfort set points used by the HVAC controller when controlling the at least part of the HVAC system of the building, the method comprising:
entering a setup mode in which the HVAC controller allows a user to edit a parameter value for each of the plurality of equipment setup parameters; and
entering a ventilation review mode in which the HVAC controller displays to a user in a read-only mode the parameter values of the ventilation related equipment setup parameters while not displaying the parameter values for the non-ventilation related equipment setup parameters,
wherein the parameter values of the ventilation related equipment setup parameters cannot be edited without exiting the ventilation review mode.

17. The method of claim 16, wherein in the ventilation review mode, the HVAC controller displays in sequence the parameter value for each of the ventilation related equipment setup parameters.

18. The method of claim 16, further comprising displaying a single screen that informs the user as to whether the parameter values of the ventilation related equipment setup parameters are correctly configured to meet a predetermined building code standard.

* * * * *